United States Patent [19]
Carlson

[11] Patent Number: 6,167,526
[45] Date of Patent: Dec. 26, 2000

[54] METHOD AND APPARATUS FOR SYNCHRONIZING A DECODER CIRCUIT WITH A PHASE-ENCODED DATA SIGNAL IN A DATA STORAGE DEVICE

[75] Inventor: Lance Robert Carlson, Niwot, Colo.

[73] Assignee: Adaptec, Inc., Milpitas, Calif.

[21] Appl. No.: 09/222,078

[22] Filed: Dec. 29, 1998

[51] Int. Cl.[7] ............................................. G06F 13/42
[52] U.S. Cl. .............................................................. 713/400
[58] Field of Search ................................... 713/400, 502, 713/503; 375/354, 355, 362; 327/12; 331/25

[56] References Cited

U.S. PATENT DOCUMENTS

| | | | |
|---|---|---|---|
| 4,754,216 | 6/1988 | Wong | 327/12 X |
| 5,005,190 | 4/1991 | Itoi | 375/357 |
| 5,187,615 | 2/1993 | Miyazawa | 360/46 |
| 5,376,894 | 12/1994 | Petranovich | 329/30 |
| 5,598,419 | 1/1997 | Weigand et al. | 370/514 |
| 5,610,949 | 3/1997 | Petranovich | 375/330 |
| 5,625,652 | 4/1997 | Petranovich | 375/355 |

*Primary Examiner*—Thomas M. Heckler
*Attorney, Agent, or Firm*—Duft, Graziano & Forest, P. C.

[57] ABSTRACT

An invention for intelligently adjusting the timing of generation of a series of detection windows to maintain synchronization with the occurrence of data pulses within a stream of phase-encoded binary data is disclosed. In an embodiment of the present invention, thresholding logic is added to a limited response self-clocking decode phased locked loop to achieve a more robust data detection method and system, which is less susceptible and sensitive to noise error. In one embodiment of the system, an up/down counter is used to count to occurrence of late and early data pulses within their respective detection window, with the timing of the generated series of detection windows being adjusted when the value of this counter exceeds an upper or lower predetermined threshold value.

20 Claims, 4 Drawing Sheets

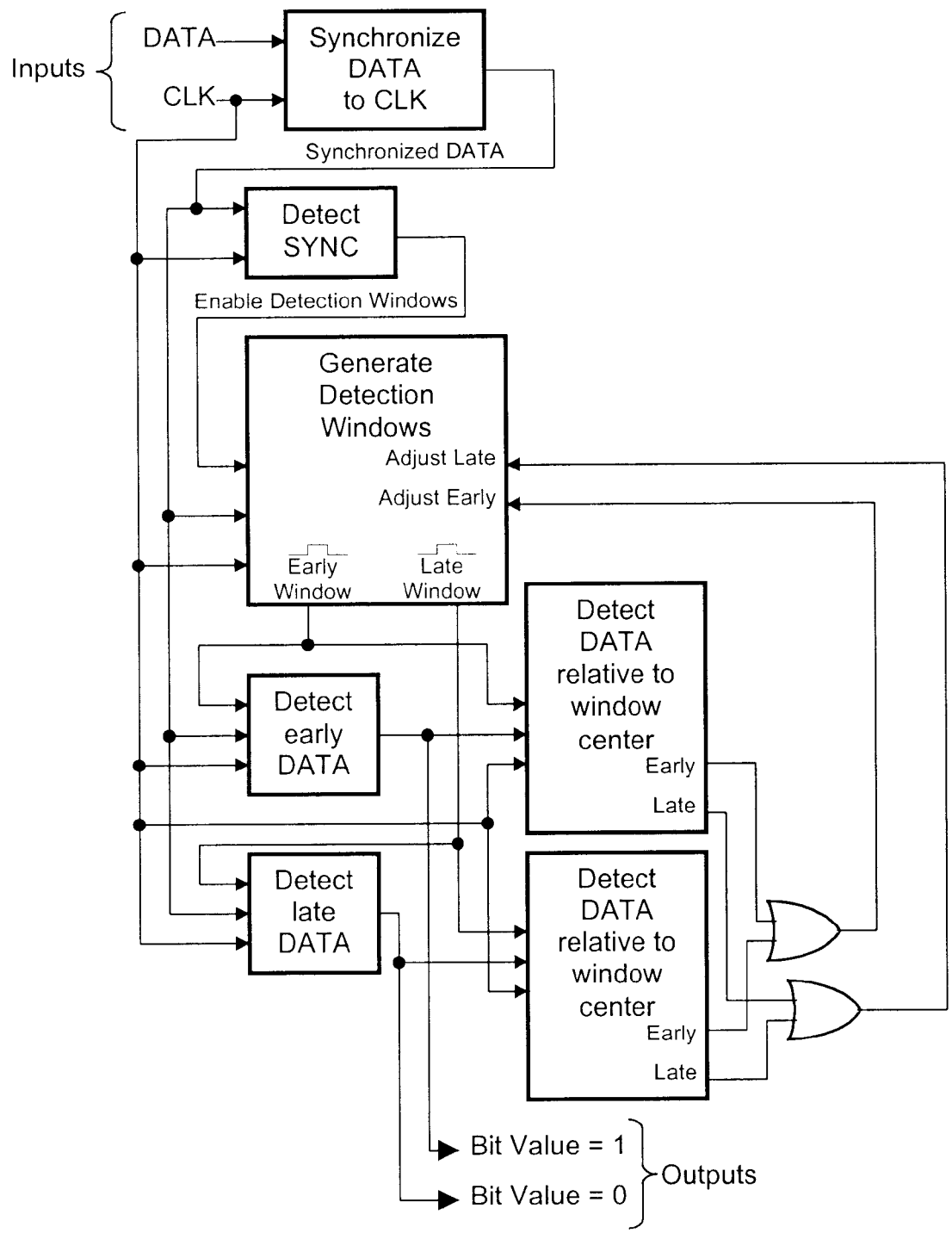
FIG. 1 - PRIOR ART

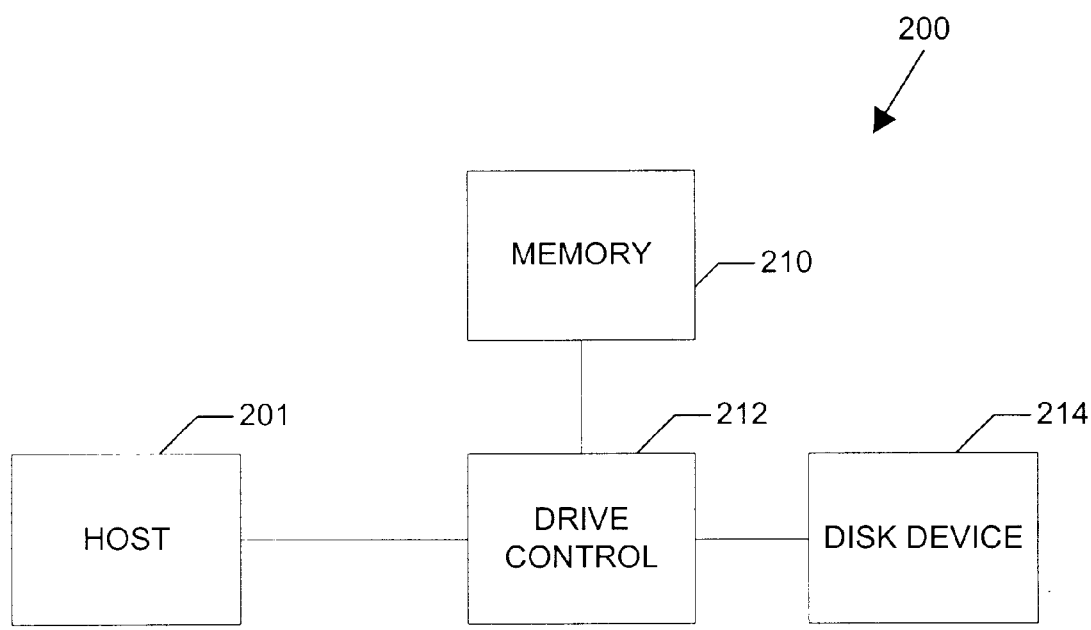
FIG. 2 - Disk Drive System

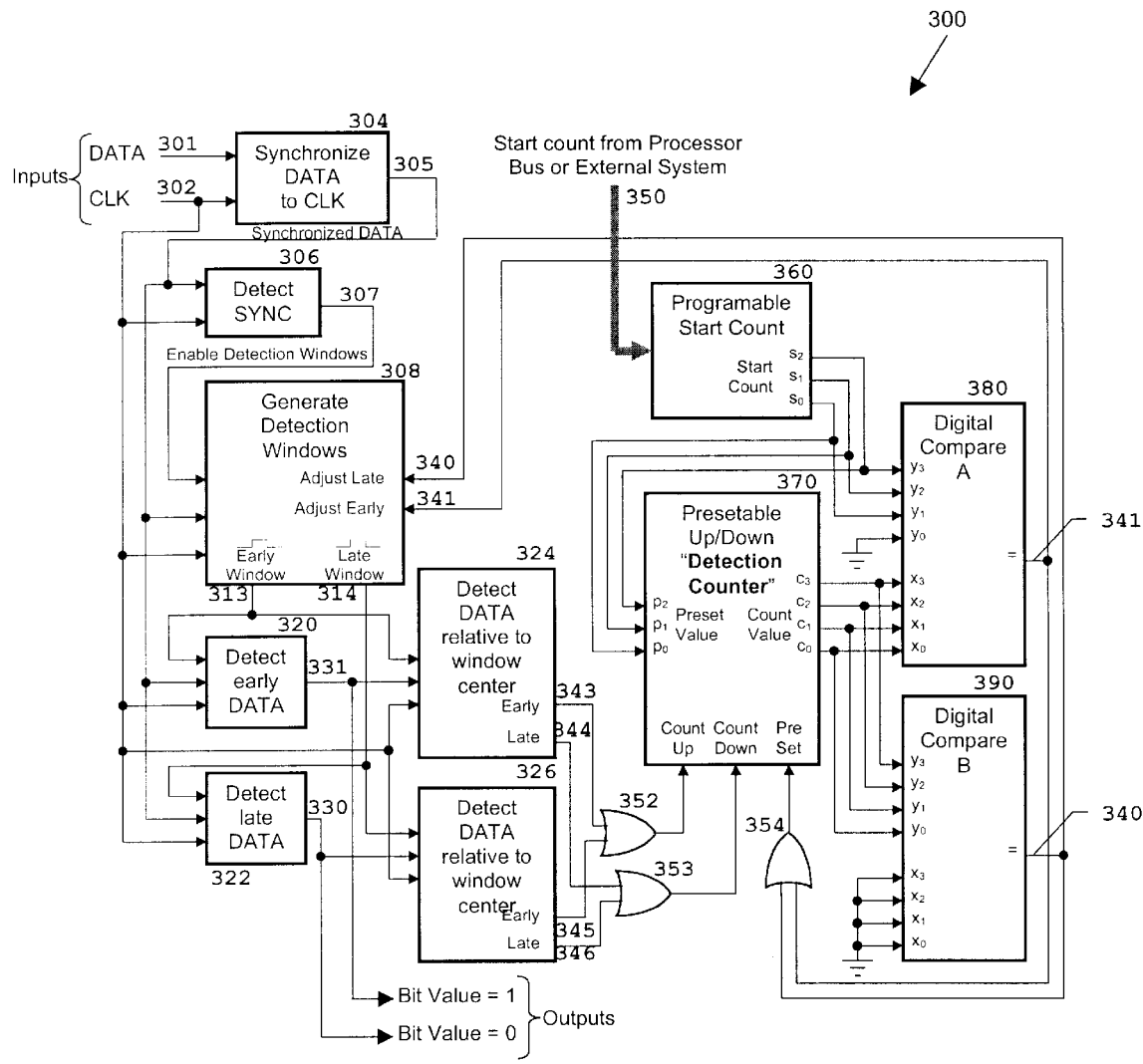
FIG. 3 - Decoder Circuit

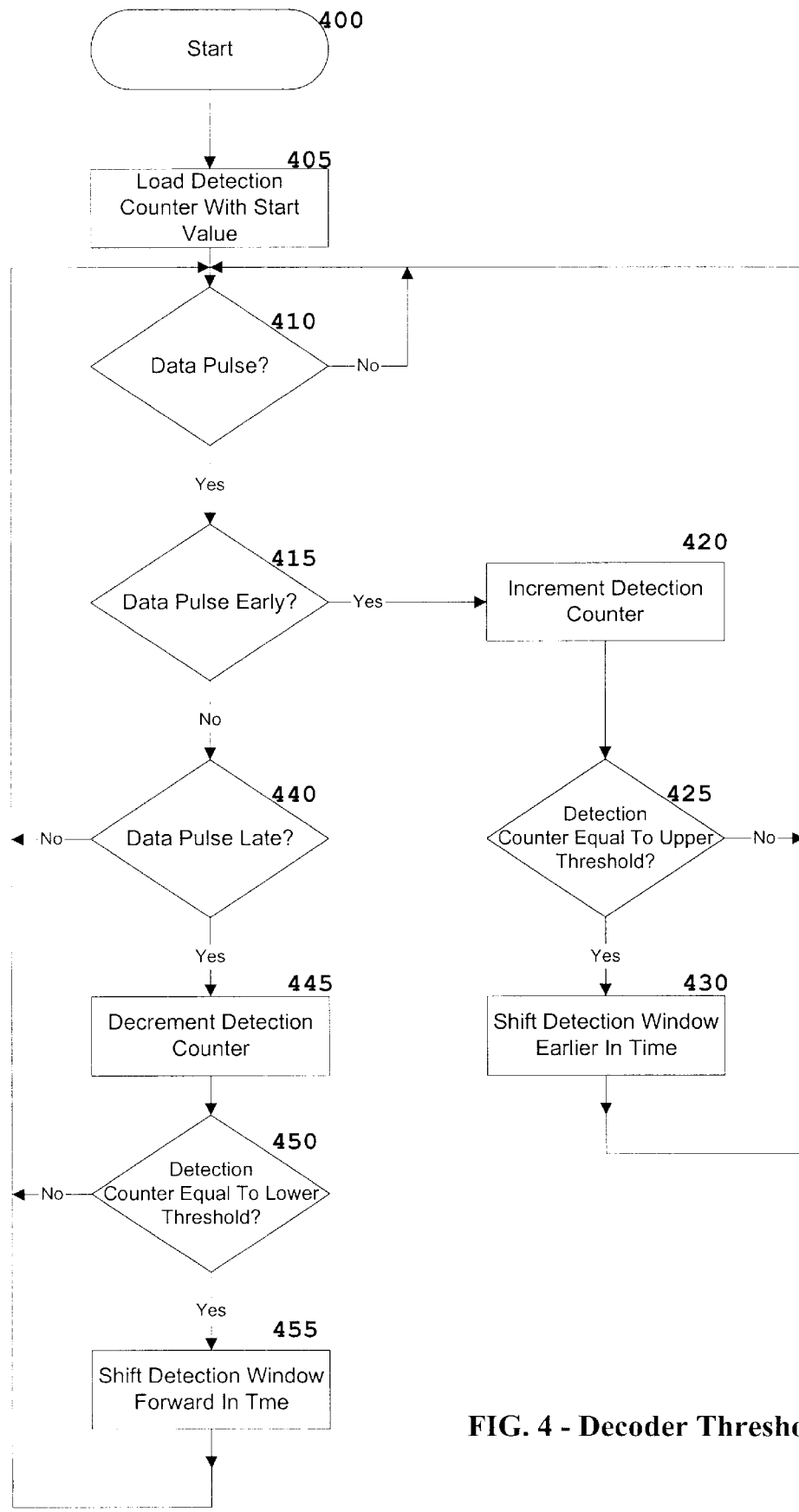
FIG. 4 - Decoder Thresholding

METHOD AND APPARATUS FOR SYNCHRONIZING A DECODER CIRCUIT WITH A PHASE-ENCODED DATA SIGNAL IN A DATA STORAGE DEVICE

FIELD OF THE INVENTION

This invention relates to computer data storage devices, and more particularly to synchronizing a decoder circuit with a phase-encoded data signal representing data stored in a disk drive.

BACKGROUND OF THE INVENTION

Users require accurate data storage and retrieval from their peripheral devices. Moreover, they desire being able to accurately store more information on these devices. Various encoding techniques have been developed to increase the data storage density on a peripheral device. The efficiency of these techniques is dependent in part on the accuracy of circuits used for identifying the location and timing of data within the signal. Increasing the accuracy will allow the storage of more information in the peripheral device.

One method of storing data on a disk uses a phase-encoded stream of data, where binary data is encoded into the relative timing between pulses in the signal stream. In this configuration, the data stream comprises overhead and data information. The overhead information is used to identify the location or timing of the data information, with the data information being partitioned into a stream of cells, with each cell representing a bit of data. Each cell is further divided into two detection windows, one of which is assigned a value of "1" and the other being assigned a value of "0". The value of the data bit is determined by the presence or absence of a pulse within these two detection windows of the cell. With a perfect signal (i.e., no noise), one data pulse occurs within each bit cell, either in the early or late detection window.

A decoder digital circuit is generally used to covert the phase-encoded signal into a digital sequence of bits (i.e., 1's and 0's) representing the stored data. A typical decoder performs several functions, including synchronizing the digital pulses in the phase-encoded signal to a precise-frequency digital clock signal; creating a sequence of detection windows; synchronizing the detection windows to the digital data (usually via some kind of synchronization pattern contained in the overhead portion in the digital signal); and converting the phase-encoded data to the binary data bit values based on the pulse locations relative to the detection windows. In addition, the decoder sometimes maintains synchronization between the detection windows and digital data, usually by shifting the time location of the detection windows early or late based on timing of the digital data signal.

In an ideal signal, the data pulses would align exactly with the detection window centers. However it is often the case that this timing is skewed such that a slight but consistent time error exists between data pulses. This scenario occurs in a data signal being derived from magnetic transitions on a disk that is rotating at a speed somewhat different than the design nominal speed. Although the error between any two adjacent pulses might be small, the error will accumulate throughout the phase-encoded pattern such that for longer patterns the error becomes significant. In this situation, the decoder must adapt and synchronize with the data signal to be able to accurately convert the signal into the data.

Commonly, one of several variations of a phase locked loop decoder circuit is used to align the detection windows with the data pulses. Such variations include an analog phase locked loop, a phase encoded data with embedded clock pulses phase locked loop, a self-clocking decode phase locked loop, and a limited response self-clocking decode phase locked loop.

An analog phase locked loop technique can be used to generate the clock signal, where the data pulses are used as the reference input to the phase locked loop.

A phase encoded data with embedded clock pulses phase locked loop adds extra clocking pulses within the data signal, such as adding one clock pulse prior to each data pulse.

A self-clocking decode phase locked loop uses each pulse in the data signal to adjust the start of the window immediately following the pulse. The following detection window is started at some predetermined or fixed time following a data pulse, which allows this method to be very sensitive to noise induced errors, which can cause a dramatic shift in the timing of the detection windows, causing an error in the detection of subsequent bits.

The limited response self-clocking decode phase locked loop, shown in FIG. 1, which compares the timing of each data pulse relative to an "ideal" time which is usually the center of the detection window. If the data pulse is early compared to the ideal time (no measurement is made of how early), then the following detection window is adjusted early by some fixed amount relative to the previous detection window, the adjustment is not made relative to the data pulse timing. Similarly, if the data pulse is late, then the following detection window is adjusted late by some fixed amount relative to the previous detection window. In some implementations, there is a provision for no adjustment if the data pulse is neither early or late, although this requires an odd number of counts per detection window, which may not fit the particular pattern timing and clock frequency choices. The fixed amount of adjustment can be made small (a low number of clock cycles or half-cycles), and thus individual data pulses with high levels of noise (large phase shifts) will not cause large changes in the detection window timing.

However, the limited response self-clocking decode phase locked loop has some deficiencies. This method does provide enough adjustment capability to mitigate any clock frequency error problems in long patterns. However, even when using a minimal detection window adjustment amount (e.g., one or one-half clock cycle) for each early or late data pulse, this method still remains susceptible and sensitive to noise error. This method also does not provide a way to adjust the response of the decoder to the various kinds of errors encountered, and thus it is not possible to optimize the decoder (e.g., minimize the error rate) based on the characteristics of the particular data signal source and noise contained therein.

SUMMARY OF THE INVENTION

According to the invention, a new method and apparatus are provided for maintaining synchronization between the data pulses and the detection windows. This invention improves the limited response self-clocking decode phase locked loop by providing intelligence on when and how to shift the detection windows. Rather than shifting the detection windows on every occurrence of an early or late pulse within a detection window, the present invention counts the number of early and late pulses, and applies one or more thresholds to intelligently adjust the timing of the detection windows. In this manner, a more robust detection circuit is disclosed which is less susceptible and sensitive to noise error, allows the adjustment of the decoder based on the characteristics of the particular signal source, and does not require additional synchronization pulses required by other methods and systems.

It should be noted that phase encoded data can be found in many applications. One of these being an embodiment of the present described herein for encoding servo position data located on the disks in disk drive products used for data storage. However, this invention is not limited to this embodiment. Rather, the teachings of this invention may be applied wherever phase-encoded data is used, while keeping within the scope and spirit of the present invention.

In one embodiment of the present invention, counters are employed to track the occurrence of early and late data pulses. Then, after a predetermined number of early data pulses are detected without any intervening late data pulses (with this predetermined number being greater than one), the detection windows are shifted earlier in time by some predetermined detection window timing adjustment amount. For example, after three consecutive early data pulses, the detection windows are shifted early by one-half clock cycle. Similarly, after a predetermined number of late data pulses are detected without any intervening late data pulses (with this predetermined number being greater than one), the detection windows are shifted later in time by some predetermined detection window timing adjustment amount.

The present invention also provides for variations of the previously described embodiment. For example, the present invention allows the number of early or late data pulses required before shifting and the amount of timing adjustment to both be programmable amounts. Additionally, the decoder, in accordance with the present invention, can automatically adjust these amounts based on some criteria, such as its recent past performance. For example, if the last time shifting of the detection windows of the decoder circuit was the same direction (and possibly within some limited predetermined amount of recent time), then the detection windows would be shifted by a correspondingly greater detection window adjustment timing amount.

Additionally, some embodiments of the present invention continuously track a combined number of late and early data pulses, and adjust the timing of the detection windows accordingly. For example, in one embodiment, a single counter is used which is preset to a given value, with the counter being incremented for each late pulse, and decremented for each early pulse. Then, when the counter equals or exceeds a late threshold, the timing of the detection windows is shifted forward by a detection window timing adjustment amount; and when an early threshold is equaled or exceeded, the timing of the detection windows is shifted backwards by a detection window timing adjustment amount.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

FIG. 1 is a circuit block diagram of a prior art limited response self-clocking decoder phase lock loop system;

FIG. 2 is a block diagram of a disk drive system;

FIG. 3 is a circuit block diagram of a decoder circuit in accordance with the present invention; and FIG. 4 is a flow diagram illustrating the thresholding steps performed by the decoder in accordance with the present invention.

DETAILED DESCRIPTION OF THE PREFERRED EMBODIMENT

With reference to FIG. 2, an exemplary system for practicing the present invention is illustrated. The disk drive system 200 includes a host 201 electrically connected to a drive control 212 controlling a disk device 214. The drive control 212 also uses some memory 210 in its operation. Although the application of this invention is described in the context of a disk drive system 200 for encoding servo position data located in the disk drive system 200 for data storage, this invention can be practiced in keeping with the scope and spirit of the present invention in most any system that uses phase encoded data.

Turning now to FIG. 3, illustrated is a decoder circuit 300, which is part of the disk device 214 (FIG. 2) in accordance with the present invention. Input to the circuit is the data signal 301 and a clock signal 302. Element 304 is used to synchronize the data signal 301 to the clock signal 302 producing the synchronized data signal 305. SYNC detect element 306 monitors the synchronized data signal 305 to identify a sync pattern which is typically a series of pulses in the data signal timed uniquely. The detect SYNC element 306 then generates an enable detection windows signal 307 which causes the generate detection windows element 308 to generate the detection windows. An early window signal 313 and a late window detection signal 314 are produced by element 308 to indicate the early and late detection windows. Elements 320 and 322 respectfully detect the presence of data within the early detection window and the late detection window, and generate corresponding signals 331 and 330 which represent the data bit value (i.e., 1 or 0). Elements 324 and 326 monitor the generated detection window signals 313 and 314, and compare with the detected early or late data signals 331, 330 to identify the detected signal 331, 330 positioned relative to the center of the detection window signal 313, 314. Element 324 then produces an early signal 343 if the detected early data was early relative to the window center or a late signal 344 if the detected data was late relative to the window center. Similarly element 326 produces early and late signals 345 and 346. The early signal 344, 345 are then OR'd by element 352 which is provided to the count of input of the detection counter 370. Late signals 344, 346 are then OR'd by element 353 and provided as input to the count down input of the detection counter 370.

Now described is the right hand side of the decoder circuit 300 which performs the thresholding and intelligent adjustment of the detection windows. Signal 340 and 341 are generated by this portion of the decoder circuit 300 and are used by previously described generate detection windows element 308 to perform the detection window timing adjustment.

Initially a programmable start count value is input to a programmable start count element 360 from an external source 350 (or could be hardwired or stored in RAM or ROM). As previously described, using a programmable start count value allows intelligent adjustment of the decoder circuit 300.

The detection counter 370 in one embodiment of the present invention is a four-bit counter. The number of bits in this detection counter 370 could vary and be more or less dependent on the requirements of particular design and application of the decoder circuit 300. The embodiment illustrated in FIG. 3 uses the same threshold value before adjusting the detection window forward or backwards. In other embodiments, additional logic in keeping with the teachings of the present invention could be added to use different values. Also, the illustrated embodiment uses one configuration to easily determine signals 340 and 341 for causing the adjustment of the timing of the detection windows. Other alternative embodiments are possible as would be understand by one skilled in the art in keeping with the scope and spirit of the present invention.

The detection counter 370 is initially loaded with the preset value contained in the programmable start count element 360. It is also preset to this value upon determination of the need to adjust the timing of the detection windows as determined by OR'ing the signals 340 and 341 by element 354. The value of the detection counter 370 is then either incremented or decremented in response to the detection of an early or late data signal relative to the center of the generated detection window by element 308. Comparators 380 and 390 are then used to determine when the value of the detection counter 370 equals the early or late threshold as determined by the value of the programmable start count element 360. In the illustrated configuration, comparator 380 compares the value of detection counter 370 to two times the value of programmable start count element 360; and similarly digit comparator 390 compares the value of detection counter 370 to zero. Whenever digital comparator 380 or 390 determines an equal value between its inputs, signals 341 or 340 are respectfully generated. By comparing the values to zero and two times the threshold value, an efficient system and method for determining whether this value is reached and in which direction (i.e., early or late).

Turn now to FIG. 4, illustrated are the steps performed by the decoder circuit 300 (FIG. 3) for thresholding an intelligently adjusting the timing of the detection windows. First, at step 400 processing begins and proceeds to step 405 where the counter is loaded with the predetermined start value. Next processing continues to step 410 which loops back upon itself until a data pulse is detected. Upon detection of a data pulse, step 415 is performed to determine whether the date pulse was early relative to the detection window. Various other techniques are possible for performing this step, such as determining the timing of the detection of a data pulse relative to the center of the appropriate detection window, and others in keeping with the scope and spirit of the present invention as would be understood by one skilled in the art.

If an early data pulse was detected in step 415, processing continues with step 420 in which the detection counter 370 (FIG. 3) is incremented. Next, in step 425, if the detection counter 370 is equal to two times the start value, then the detection window is shifted by some predetermined detection window timing adjustment value in step 430, and processing returns to step 405. If the data pulse was not detected as being early in step 415, processing continues to step 440 to determine whether the data pulse was late within the respective detection window. If so, the detection counter 370 is decremented in step 445; and then, in step 450, the value of the detection counter 370 is compared against zero. If it is equal to zero, then the detection window is shifted forward in time by the appropriate predetermined detection window timing adjustment value in step 455, and processing returns to step 405.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A method for synchronizing detection windows with a stream of phase-encoded digital data produced from a computer device, the method comprising the steps of:

determining whether an individual data pulse within the stream of phase-encoded digital data occurs late with respect to a corresponding detection window;

determining whether an individual data pulse within the stream of phase-encoded digital data occurs early with respect to a corresponding detection window;

counting occurrences of late data pulses;

counting occurrences of early data pulses;

comparing the count of late occurrences of data pulses with a predetermined late threshold value greater than one;

adjusting the detection windows later in time when the count of late occurrences equals or exceeds the late threshold value.

comparing the count of early occurrences of data pulses with a predetermined early threshold value greater than one; and adjusting the detection windows earlier in time when the count of early occurrences equals or exceeds the early threshold value.

2. The method of claim 1, wherein the count of late occurrences of data pulses is reset in response to a subsequent occurrence of an early occurrence of one of the data pulses; and the count of early occurrences of data pulses is reset in response to a subsequent occurrence of a late occurrence of another one of the data pulses.

3. The method of claim 2, wherein the computer device is a disk device.

4. The method of claim 1, wherein the computer device is a disk device.

5. The method of claim 4, wherein the predetermined early threshold value is three; and the predetermined late threshold value is three.

6. The method of claim 5, wherein the detection windows are shifted by one-half clock pulse.

7. A system for synchronizing a generation of a series of detection windows with a stream of phase-encoded digital data produced from a computer device, the system comprising:

a detection window generating element for generating the series of detection windows;

a data signal containing synchronization and user data;

a relative data detection circuit for determining the respective location of a pulse within the data signal with respect to a corresponding generated detection window; and a thresholding detection window adjustment circuit generating one or more detection window adjustment signals;

whereby the detection window generating element adjusts the timing of the generation of the series of detection windows based at least in part on the one or more detection window adjustment signals.

8. The system of claim 7, wherein the thresholding detection window adjustment circuit includes a detection counter for counting the number of late and early data pulses; and one or more elements for comparing the value of the detection counter with one or more predetermined threshold values.

9. The system of claim 8, wherein the count of late occurrences of data pulses is reset in response to at least one of the detection window adjustment signals indicating a need to adjust the timing of the generated series of detection windows.

10. The system of claim 9, wherein the detection counter is an up/down counter.

11. The system of claim 10, wherein the computer device is a disk device.

12. The system of claim 7, wherein the detection counter is an up/down counter.

13. The system of claim 12, wherein the computer device is a disk device.

14. The system of claim 7, wherein the computer device is a disk device.

15. The system of claim 14, wherein the one of the predetermined threshold values is three.

16. The system of claim 15, wherein the generated series of detection windows are shifted by one-half clock pulse.

17. A method for synchronizing detection windows with a stream of phase-encoded digital data produced from a computer device, the method comprising the steps of:

generating a series of detection windows;

determining whether individual data pulses within the stream of phase-encoded digital data occur late with respect to a corresponding detection window;

determining whether the individual data pulses within the stream of phase-encoded digital data occur early with respect to a corresponding detection window;

adjusting a counter in one direction in response to the determination of an early occurrence of data pulse, and adjusting a counter in the opposite direction in response to the determination of a late occurrence of data pulse;

comparing the value of the counter with an early threshold value, and adjusting the generation of the detection windows earlier in time when the value of the counter equals or exceeds the early threshold value; and comparing the value of the counter with a late threshold value, and adjusting the generation of the detection windows later in time when the value of the counter equals or exceeds the late threshold value.

18. The method of claim 17, wherein the counter is reset to an initial value in response to an adjustment of the generation of the detection windows.

19. The method of claim 18, wherein the computer device is a disk device.

20. The method of claim 17, wherein the computer device is a disk device.

* * * * *